Figure 1:
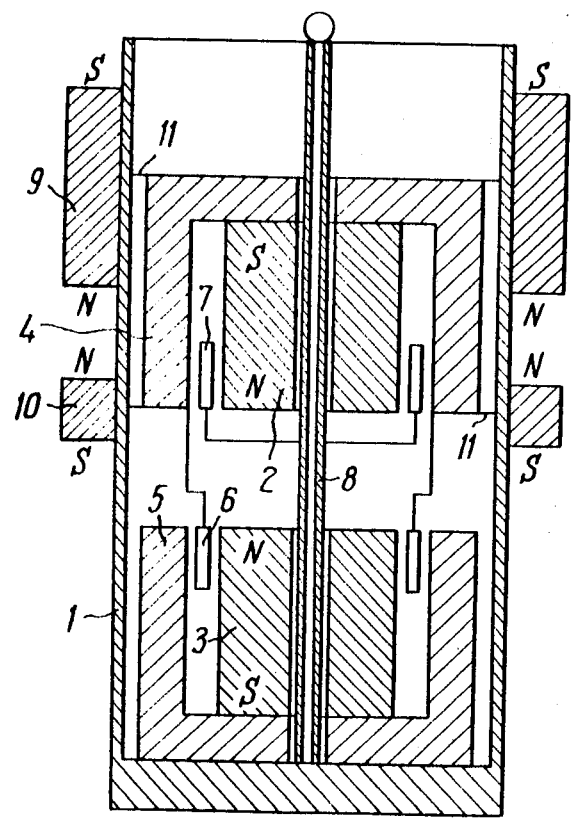

United States Patent

[11] 3,582,874

| [72] | Inventor | Nikolai Efimovich Fedoseenko |
| | | Nizhnaya Syromyatnicheskaya ulitsa 2/3, kv. 52, Moscow, U.S.S.R. |
| [21] | Appl. No. | 806,625 |
| [22] | Filed | Mar. 12, 1969 |
| [45] | Patented | June 1, 1971 |

[54] ELECTRODYNAMIC SEISMIC RECEIVER
8 Claims, 2 Drawing Figs.
[52] U.S. Cl. ............................................. 340/17, 181/.5
[51] Int. Cl. ............................................. G01v 1/16
[50] Field of Search ............................................. 181/.5 EM; 340/17

[56] References Cited
UNITED STATES PATENTS

| 2,657,374 | 10/1953 | Bardeen | 340/17 |
| 2,751,573 | 6/1956 | Millington | 340/17 |
| 3,100,292 | 8/1963 | Warner, Jr. et al. | 340/17 |
| 3,157,852 | 11/1964 | Campbell et al. | 340/17 |

Primary Examiner—Rodney D. Bennett, Jr.
Assistant Examiner—Brian L. Ribando
Attorney—Waters, Roditi, Schwartz & Nissen ABSTRACT: An electrodynamic seismic receiver is provided with a hollow housing in which is supported two magnets one of which is movable vertically. Also provided either externally of the housing or internally therein are a pair of shiftable control magnets, one of which acts on the movable magnet to set a neutral position, and the other of which control magnets acts on the movable magnet for controlling the vibration thereof.

ELECTRODYNAMIC SEISMIC RECEIVER

The present invention relates generally to geophysical instruments and more particularly to highly sensitive portable electrodynamic seismic receivers adapted to be employed both in deep wells and on the surface for detection of weak and removed seismic signals, for suppression of interferences and for separation of a desired signal against the back ground of the interferences involved.

Known in the present state of the art are electrodynamic seismic receivers comprising two coaxial magnetic systems one of which, that is essentially an inert mass, is repulsed from the other by a stray field which is created in the gaps of both magnetic systems wherein coil windings are accommodated (cf., for example, Author Certificate No. 142780, cl.42c 42, 1961).

The electrodynamic seismic receivers mentioned above operate only on a fixed frequency, since a natural frequency of oscillations of the inert mass is determined by the weight thereof and cannot be varied, which fact limits the field of application of said seismic receivers. Apart from the abovesaid, the coil windings are not adapted to operate under high temperature conditions.

The main object of the present invention is to provide an electrodynamic seismic receiver operable under temperature variations from −80° C. to +130° C. without resorting to any compensating means.

Another object of the present invention is to provide an electrodynamic seismic receiver featuring unlimited oscillations associated with a threshold of elasticity which is a characteristic feature of oscillating systems, wherein used as a suspension means for an inert mass are various kinds of springs.

It is still another object of the present invention to provide an electrodynamic seismic receiver that will be capable of receiving low frequency seismic signals with remote variation thereof in case of operation of said receiver under high or low temperature environmental conditions in deep wells.

With these and other objects in view, the electrodynamic seismic receiver comprising two coaxial magnetic systems one of which, that is essentially an inert mass, is repulsed from the other by a stray field created in the gaps of both magnetic systems, wherein coil windings are accommodated, and according to the invention, provision is made for coaxially arranged magnets one of which is adapted for keeping the magnetic system, that is essentially an inert mass, in the neutral zero position, whereas the other magnet is adapted for varying the natural period and for damping the same system.

It is expedient that the two magnets be mounted on the body of the seismic receiver parallel to both magnetic systems so as to traverse along the body and that one of said magnets be capable of interacting only with the magnetic system, that is essentially an inert mass, whereas the other magnet be capable of interacting with both magnetic systems.

It is advantageous that both magnets be accommodated within the magnetic system, that is essentially an inert mass, to traverse along the axis of the seismic receiver so as to be capable of interacting with said magnetic system.

Such a design makes it possible to provide a low frequency electrodynamic seismic receiver featuring a powerful transducer enabling the receiver to be employed in a well without preamplification of signals, and operable under temperature environmental conditions of from −80° C. to +130° C.

Figure 2:
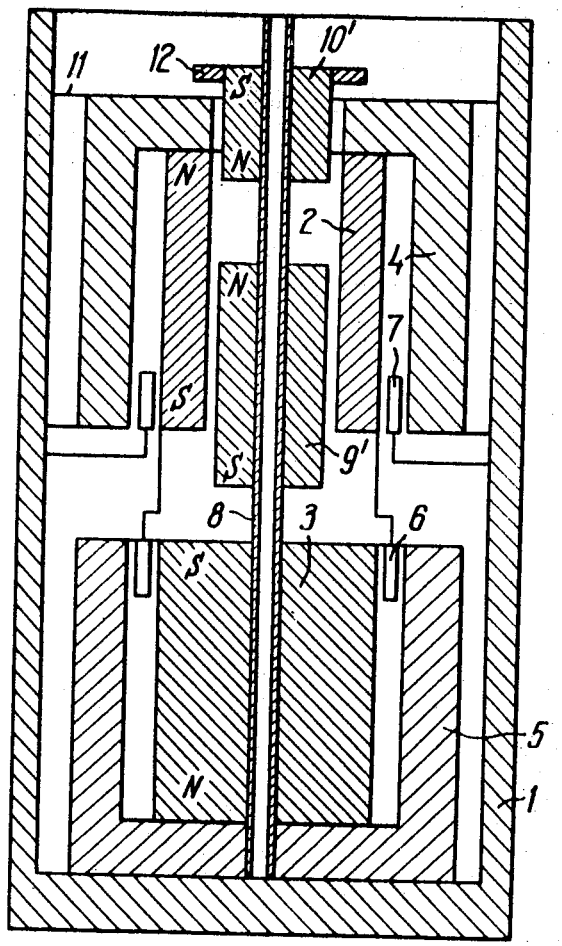

Other objects and advantages of the present invention will be more apparent from a detailed consideration of the embodiments thereof and with due reference to the accompanying drawings, wherein:

FIG. 1 represents one of the embodiments of the seismic receiver in contemplation (longitudinal section), and FIG. 2 represents another embodiment of the seismic receiver (longitudinal section).

According to the present invention, the electrodynamic seismic receiver implemented according to the first embodiment, comprises coaxial upper and lower magnetic systems both accommodated within the body 1 (FIG. 1) one of which (the upper system) is essentially an inert mass. Both magnetic systems feature magnets 2 and 3 and magnetic cores 4 and 5. The windings of coils 6 and 7 of the upper and lower magnetic systems are respectively accommodated within the gaps of the lower and upper magnetic systems. The coil 7 is mounted on the axis 8 of the seismic receiver, whereas the coil 6 is mounted fast on the magnetic core 4.

Coaxially arranged ring-shaped magnets 9 and 10 are mounted on the body 1 parallel to both magnetic systems to traverse along the body 1. The magnet 9 is adapted for keeping the upper magnetic system in the zero position, whereas the magnet 10 is adapted for varying the natural period and damping the upper magnetic system and is an astatizing magnet.

The upper magnetic system is centered within the body 1 by means of upper and lower shaped washers 11.

The ring-shaped magnet 9 serves as a main magnet spring capable of supporting the upper magnetic system. Since the above-mentioned system is strictly disposed with respect to the center, the force of interaction between the system and the magnet 9 is equal around the entire circumference. This permits the maintenance of the inert mass in position without resorting to a damper coil, and provides for smooth control and reasonably low natural frequency of the system.

Moreover, the elastic forces associated with the washers 11 act in the direction perpendicular to the axis of movement of the inert mass and are capable of returning the inert mass in the operating position in case of shocks, jolts etc.

The lower natural frequency of oscillations of the inert mass is likewise achieved since the field created by the astatizing ring-shaped magnet 10 interacts with the stray field created by the upper and lower magnetic systems with resultant repulsion of both fields (polarities N–N) which decreases the restoring force capable of keeping the inert mass in position, and, consequently, increases the natural period of oscillations of the inert mass.

The combined control of both the natural period and damping is provided by traversing the magnets 9 and 10 with respect to the magnetic systems.

In the second embodiment of the seismic receiver in contemplation the magnets 9' and 10' (FIG. 2) are mounted within the upper magnetic system for traversing along the axis 8. Such an arrangement of the magnets makes it possible to substantially decrease the size of the instrument, to promote its sensitivity and to cut down the amount of magnetic material required to manufacture the above-mentioned magnets.

Apart from the abovesaid, the magnetic field created by the magnet 9' adds to the intensity of the magnetic field created by the magnet 2, which results in an increased magnetic flux in the gap of the upper magnetic system which fact respectively increases the EMF in the turns of the coil 7, said turns being accommodated within the above-mentioned gap.

The lower natural frequency of oscillations of the inert mass is achieved since the magnetic field created by the magnet 10' interacts with the stray field created by the upper magnetic system with resultant repulsion of both said fields (polarities N–N) which decreases the restoring force capable of keeping the inert mass in position, and consequently, increases the natural period of oscillations of the inert mass. The natural period of oscillations of the inert mass in the herein-disclosed construction varies from 0.5 to 1.5 sec.

The combined control of both the natural period and damping is affected by traversing the magnets 9' and 10' with respect to the upper magnetic system.

The variation of the natural period of oscillations of the inert mass is provided by remote traversing of either of the magnets 10 or 10', respectively, along the body 1 and the axis 8, for example, by means of reversible electric motor or by supplying DC voltage to the coil 7. The electromagnetic field arising in the winding of the coil 7 interacts with the constant magnetic field created by the magnetic system, thereby either weakening or intensifying this depending on the value of the voltage applied and the sign thereof which results in a correspondingly weakened or intensified magnetic field capable of supporting the inert mass, and consequently, in increased or decreased natural period.

The operating principle of the seismic receiver in contemplation according to the first embodiment is as follows.

The inert mass is kept in the neutral zero position by means of the magnet 9 and is repulsed from the lower magnetic system. The desired natural period and damping is provided by the position of the astatizing magnet 10. Under the effect of deflection forces applied to the body 1 (for example, underneath the body), the inert mass while tending to keep its initial position, will move downwardly with respect to the body 1 the coil 6 being likewise displaced downwardly in the gap of the lower magnetic system. The coil 7 together with the body 1 will deflect upwards with respect to the upper magnetic system.

The external arrangement of the magnets 9 and 10 provides for the response of the inert mass to even slight variations of the magnetic fields created by the magnets 9 and 10, which fact makes it possible to use the herein-proposed instrument as a seismic magnetometer.

So, for example, when lowering the instrument into a well it will be capable of registering the butt joints of the pipes or the presence of ore or ferromagnetic bodies by virtue of natural frequency variations of oscillations of the inert mass.

The operation of the seismic receiver implemented according to the second embodiment is generally similar to that of the seismic receiver implemented according to the first embodiment.

The difference being that the magnetic field created by the magnet 9' intensifies the magnetic field created by the magnet 2, thereby increasing the magnetic flux in the gap the upper magnetic system, wherein the coil 7 is accommodated. The inert mass is set into the zero position by displacing the magnet 9' either upwardly or downwardly.

The magnet 10' is displaced through the use of the electric motor (not shown in the drawing) either upwardly or downwardly. The displacement of the magnet 10' provides for an astatizing process, i.e. upon an increase or decrease of the natural period of oscillations of the inert mass.

The process of astatizing is associated with arresting and releasing of the instrument. The projections 12 arranged on the magnet 10', when being in the bottommost position, are capable of arresting the instrument when lowering the latter into a well or when transporting it. When releasing the instrument the projections 12 release the inert mass and the magnet 10 lifts.

With the magnet 10' lifted or lowered, the variation of natural frequency oscillations of the inert mass and tuning of the instrument for the preset parameters occur.

The seismic receiver in contemplation feature no coil springs which fact provides for its employment in deep wells for registering remote explosions and the detection thereof. The above-mentioned seismic receiver is applicable in deep wells without an auxiliary amplifier. High stability makes it possible to employ said seismic receiver for the purpose of mass grouping where identity and constant parameters are of vital importance.

The above-mentioned seismic receiver is serviceable under the temperature environmental conditions of −80° C. to +130° C. The employment of the seismic receiver under higher temperatures is limited due to insulation of the wire of the coil windings. When utilizing more thermally resistant insulation, said seismic receiver can be employed under the temperature environmental condition of +250° C.

The seismic receiver in contemplation features a substantially reduced threshold of elasticity of the suspension of the inert mass which provides for a considerably increased amplification of received seismic signals when resorting to the above-mentioned seismic receivers.

Though this invention has been described herein with reference to the preferable embodiment, it will be understood that minor changes in the details of the construction may be made without departing from the spirit and scope of the invention, as will be readily understood by those competent in the trade.

All these alterations and changes will be considered to remain within the spirit and scope of the invention and claims that follow.

I claim:

1. An electrodynamic seismic receiver comprising a body provided with a cavity, a first magnetic system shiftably supported in the cavity of said body, a second magnetic system supported in the cavity of said body, said first and second magnetic systems each being provided with a flux gap, a first coil rigidly supported in the cavity of said body and extending into the flux gap of said first magnetic system, a second coil rigidly supported by the first magnetic system in the cavity of said body and extending into the flux gap of said second magnetic system, a third magnetic system shiftably supported by said body for acting on said first magnetic system, and a fourth magnetic system shiftably supported by said body for acting on said first magnetic system.

2. An electrodynamic seismic receiver as claimed in claim 1, wherein said third and fourth magnetic systems are each shiftably supported externally of said body.

3. An electrodynamic seismic receiver as claimed in claim 1, wherein said third and fourth magnetic systems are each shiftably supported internally of the cavity of said body.

4. An electrodynamic seismic receiver as claimed in claim 1, including a rod extending in the cavity of said body, said first and second magnetic systems each surrounding said rod, said first coil systems including a portion mounted on said rod, said second coil systems including a portion mounted on said first magnetic systems.

5. An electrodynamic seismic receiver as claimed in claim 4, including a pair of spaced resilient washers surrounding said rod, said first magnetic system being supported between said pair of spaced resilient washers.

6. An electrodynamic seismic receiver as claimed in claim 3, wherein said first magnetic system is provided with a cavity, and including a rod extending in the cavity of said body and into said cavity of said first magnetic system, said third and fourth magnetic systems each surrounding said rod and being shiftably engageable with said rod internally of said cavity of said first magnetic system.

7. An electrodynamic seismic receiver as claimed in claim 6, including a projection extending from said fourth magnetic system for engaging said first magnetic system.

8. An electrodynamic seismic receiver as claimed in claim 1, wherein said first and second magnetic systems each includes a pair of poles of opposite polarity, the polarity of one of said poles of said second magnetic system being of the same polarity as that of one of said poles of said first magnetic system most proximate thereto for repelling said first magnetic system.